United States Patent
Sakarya

(10) Patent No.: US 7,248,853 B1
(45) Date of Patent: Jul. 24, 2007

(54) DIRECT COMMUNICATION AND LOCALISATION OF MOBILE END EQUIPMENT AND EMERGENCY HANDLING

(75) Inventor: Taskin Sakarya, Stettiner Str. 41, Korntal-Muenchingen (DE) D-70825

(73) Assignee: Taskin Sakarya, Ehringshausen (DE)

(*) Notice: Subject to any disclaimer, the term of this patent is extended or adjusted under 35 U.S.C. 154(b) by 19 days.

(21) Appl. No.: 10/110,238

(22) PCT Filed: Jul. 25, 2000

(86) PCT No.: PCT/EP00/07113

§ 371 (c)(1),
(2), (4) Date: Apr. 10, 2002

(87) PCT Pub. No.: WO01/28266

PCT Pub. Date: Apr. 19, 2001

(30) Foreign Application Priority Data

Dec. 10, 1999 (EP) .................................. 99120291
Feb. 3, 2000 (EP) ...................... PCT/EP00/00852

(51) Int. Cl.
*H04M 11/04* (2006.01)

(52) U.S. Cl. ................................ 455/404.1; 455/456.1; 455/411

(58) Field of Classification Search ................ 455/507, 455/423, 450, 404, 411, 456, 562, 561, 404.1, 455/404.2, 425, 426.1, 456.1
See application file for complete search history.

(56) References Cited

U.S. PATENT DOCUMENTS

| 4,534,061 | A | 8/1985 | Ulug | 455/17 |
| 5,686,886 | A | 11/1997 | Stensney | 340/539.14 |
| 5,890,054 | A | 3/1999 | Logsdon et al. | 455/11.1 |
| 5,901,342 | A | 5/1999 | Heiskari et al. | 455/11.1 |
| 6,047,178 | A | 4/2000 | Frlan | 455/423 |
| 6,188,913 | B1* | 2/2001 | Fukagawa et al. | 455/562.1 |
| 2002/0086659 | A1 | 7/2002 | Lauper | 455/404 |

* cited by examiner

*Primary Examiner*—Matthew Anderson
*Assistant Examiner*—Tan Trinh

(57) ABSTRACT

In a mobile network at least one direct communication channel between mobile stations is provided. The direct communication channel is used by a mobile station (MS 1) for broadcasting periodical emergency data messages, within near vicinity and to other mobile devices, which comprise means for estimating distance and/or direction to the this mobile station. In particular, for evaluating signal strength and/or other properties of the emergency signal where different emergency signals are provided differing in amplitude, frequency and/or pattern and where these emergency signals can be received by other mobile stations (MS2) or by network antennas (TRX1) or by special localization equipments (MSTRACK, 5,6,7) in such a way that the signal is used for localizing the first mobile station (MS1) to a high precision.

8 Claims, 3 Drawing Sheets

DIRECT COMMUNICATION AND LOCALISATION OF MOBILE END EQUIPMENT AND EMERGENCY HANDLING

CROSS-REFERENCE TO RELATED APPLICATIONS (a) Direct Communication Wireless Radio System (U.S. Pat. No. 6,047,178 Apr. 4, 2000)

(b) Emergency Call System Within a Telecommunication Network (Patent Application Publication US 2002/0086659 Jul. 4, 2002)

(c) Deterministic Multi-Access Method For a Decentralized Mobile Radio System (U.S. Pat. No. 4,534,061 Aug. 6, 1985)

(d) Establishment of a Call In a Mobile Communication System (U.S. Pat. No. 5,901,342 May 4, 1999)

(e) Emergency Mobile Routing Protocol (U.S. Pat. No. 5,890,054 Mar. 30, 1999)

STATEMENT REGARDING FEDERALLY SPONSORED RESEARCH OR DEVELOPMENT

Not Applicable.

REFERENCE TO A SEQUENCE LISTING, A TABLE OR A COMPUTER PROGRAM

Not Applicable.

BACKGROUND OF THE INVENTION

1. Field of the Invention

The invention relates to a mobile communication network system, a method of operation, and a mobile station in such a system according to the preamble of the independent claims. In particular, the invention relates to direct communication and localisation of mobile end equipment and emergency handling.

2. Description of the Related Art

U.S. Pat. No. 6,047,178 discloses a way of direct communication between two mobile stations using a voice channel, under the supervision of mobile network MSC.

This patent application (Ser. No. 10/110,238) in comparison provides a communication from one mobile station to others as through broadcast messages using repeated broadcast messages as SOS messages and without supervision of mobile network. It is operable even when there is no network available.

Patent Application Publication US 2002/0086659 shows a way of handling emergency messages efficiently in that the messages are directed to a device (away from the SOS sender and a device as part of the network itself, for example an MSC), which has a database, in that it recognises the type of message and knows other mobile devices in the vicinity so that the emergency message can be directed towards these mobile devices.

This patent application (Ser. No. 10/110,238) in comparison discloses an emergency system in that the mobile phone sends emergency messages as periodically repeated (SOS) messages, which are directly detected by the authorized mobile devices in the vicinity. These devices have means to dynamically locate the position of the SOS sender. This is achieved with a high precision of localization, due to repetition of the messages that convey information to help positioning.

U.S. Pat. No. 4,534,061 discloses deterministic multi-access method for a decentralized mobile radio system. A mobile radio system uses a predetermined number of control channels over which a hand-shake routine is performed to determine called station availability, before one of a limited number of talk channels (local and repeater) is assigned for communication between a calling and the called station.

This patent application (Ser. No. 10/110,238) in comparison allows a mobile station to use a pre-allocated broadcast channel, to broadcast weak emergency messages, as to be detected by other mobiles in the near vicinity.

U.S. Pat. No. 5,901,342 relates to a method of establishing a call between two mobile stations.

This patent application (Ser. No. 10/110,28) in comparison relates to sending direct messages from one mobile to others without direct intervention of the mobile network.

U.S. Pat. No. 5,890,054 discloses a routing protocol, which enables emergency communication between a distressed mobile device and the system backbone, using another mobile device as intermediary.

Within this patent application (Ser. No. 10/110,28) in comparison, a method is described where another mobile device take over the SOS message sending, in case the distressed mobile telephone runs out of battery. In which case however, it does not convey the emergency message to a certain address but instead start broadcasting the original message the same way as the SOS phone.

BRIEF SUMMARY OF THE INVENTION

Although localisation of the mobile station to tenths of meters is available by different techniques, such as via Mobile End User Equipment own measurements, or via GPS at the mobile station, this is not sufficient enough for most emergency situations. For example in case of an emergency call within a skyscraper, an emergency call of a mobile phone may be localised within a 50 meter radius. But this may mean an emergency call out of one of 20 floors and 80 apartments. Only a localisation of some meters as provided by the present invention can make the difference in terms of help in time.

Mobile End User Equipment shall go into an Emergency Mode of Operation (EMO) and continuously or with intervals transmit an GSM/UMTS SOS frequency signal (SOS-FREQ) or an SOS pattern or an SOS message, which can be easily tracked and localised directly (without first being handled by the mobile network itself) via external tracking equipment, via other MS equipments. MSTRACK in FIG. 1 is only a symbolic representation. Depending on the design, a different type of directional antenna and tracking equipment can be used. For example a special mobile phone equipped with extra tracking hardware and software or a mobile phone equipment together with other external equipment such as a Personal Computer can be used.

The second mobile station (MS 2) and/or a network (8) dedicated for receiving and evaluating emergency signals comprises means for estimating distance and/or direction to said first mobile station (MS 1), in particular for evaluating a signal strength and/or other properties of the emergency signal.

Even in the case that mobile equipment localisation info cannot be passed to an Emergency Centre, and an emergency situation arises, MS enters into EMO (Emergency Mode of Operation) and starts transmitting SOSFREQ, SOSPAT and/or SOSTON. These can be received by external equipment designed to localise and interpret such signals to some meters. The external tracking mobile equipment (MSTRACK) has a directional antenna and measures the signal strength at short distances.

Additionally, or alternatively, special network receiver elements, such as antennas, and related equipment can be stationed at places where such emergencies may arise. These network elements can be connected to emergency centres, to warn the centre about the existence of such an alarm.

BRIEF DESCRIPTION OF THE SEVERAL VIEWS OF THE DRAWINGS

FIG. 1 shows one embodiment of the present invention, in particular a mobile communication network system 1 comprising a plurality of mobile stations and a backbone communication network 2 with network antennas TRX 1 for establishing communication 3 between a first mobile station MS 1 of said plurality of mobile stations and said backbone communication network 2, wherein at least one direct communication channel is provided by said backbone communication network 2, said direct communication channel can be used by said first mobile station MS 1 for directly communicating 4 with at least one second mobile station MS 2 of said plurality of mobile stations. Also the inventive operation method is implemented in the mobile communication network system 1 and the mobile station MS 1 is according to one embodiment of the invention.

Figure 1:
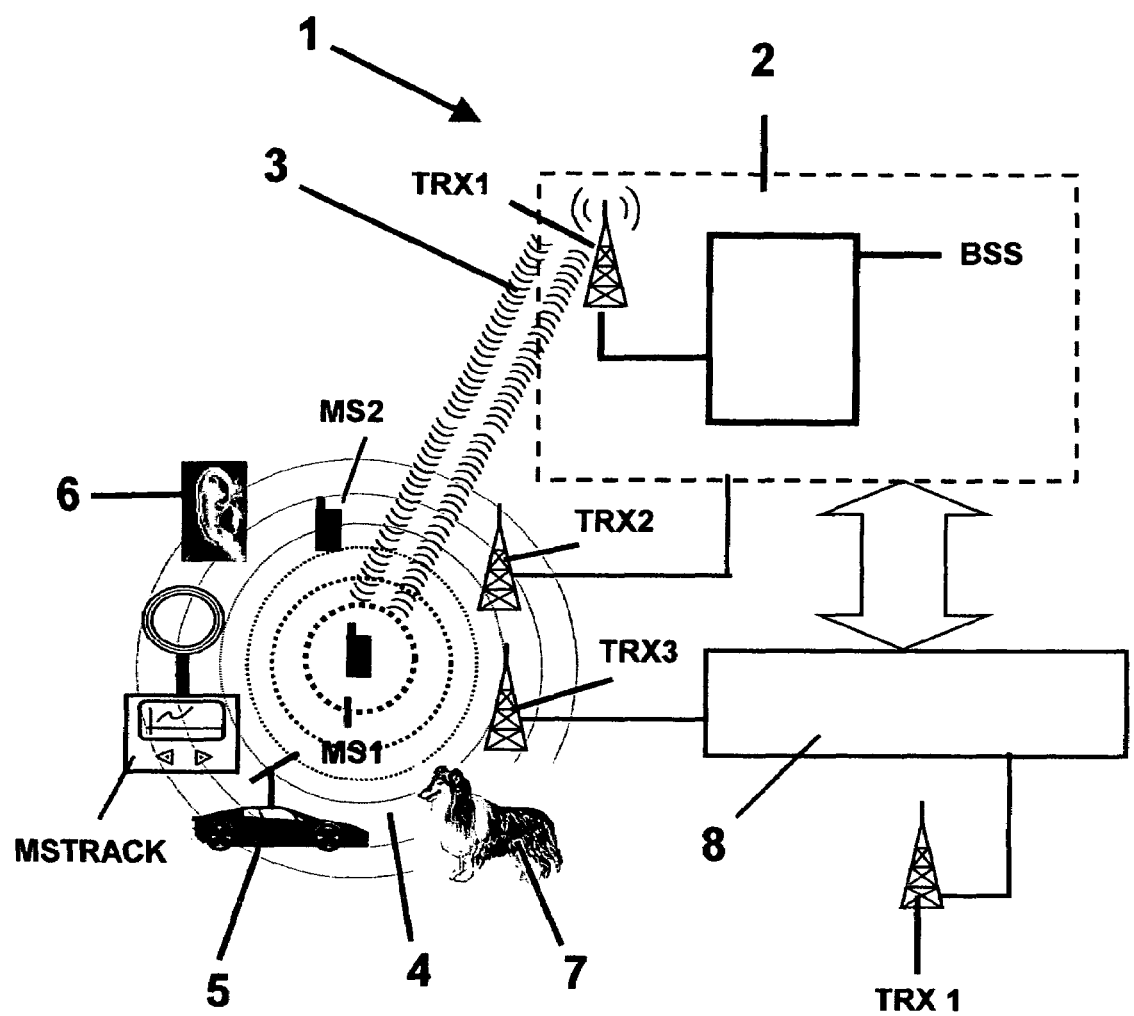
FIG. 1 shows one embodiment of the present invention.

The mobile station MS 1 communicates with the backbone network 2 to receive information about MTM communication (chatline or emergency) frequencies, channels, patterns, and/or tones. This information can be broadcasted or be given to the mobile stations upon need, i. e. upon request for chatline, during alarm call or as a response to a related SMS message. As a supplement or alternatively, emergency signal or MTM communication signals can be received and evaluated by backbone network 2 at TRX 2 and/or at TRX 3, in particular using a specially dedicated network 8, for example controlled by an emergency centre, which has own antennas TRX 3.

The mobile station MS 1 transmits to the backbone network 2, i.e. to the network antenna TRX 1, an emergency signal as well as to the mobile station MS 2 using direct communication 4 according to the present invention. Simultaneously the mobile station MS 1 transmits a radio signal trackable by MSTRACK equipment that can be mobile itself, e.g. built in a car 5, and also transmits an audio signal audible by human beings 6 and/or and ultrasound signal audible by tracking dogs 7. The first mobile station MS 1 can be localised using one or some of the signals transmitted.

MSTRACK in FIG. 1 is only a symbolic representation. Depending on the design, a different type of directional antenna and tracking equipment can be used. For example a special mobile phone equipment with extra tracking hardware and software or a mobile phone equipment together with other external equipment such as a Personal Computer can be used.

The emergency signal received by the backbone network 2 is transmitted to the Emergency Centre which has own antennas TRX 3 for receiving emergency signals and/or guiding the police or ambulance.

Figure 2:
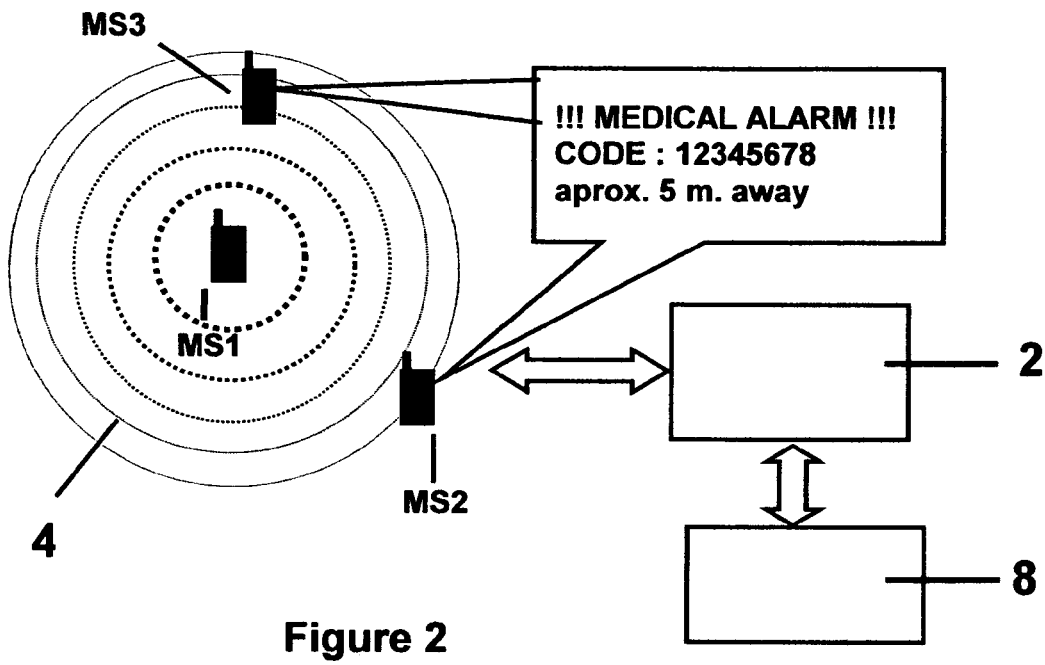
FIG. 2 shows a first mobile station transmitting on a predetermined SOSFREQ.

FIG. 2 shows a first mobile station MS 1 transmitting on a predetermined SOSFREQ a predetermined SOSPAT having the meaning "MEDICAL ALARM" with a corresponding code and providing localisation information, and simultaneously a predetermined SOSTON. Second and third mobile stations MS 2 and MS 3 receive the transmission of the first mobile station MS 1, which is not able to reach a network antenna TRX 1 due to low battery status or geographical circumstances, and forward the SOSFREQ/SOSPAT to the backbone network 2 which gives alarm to the emergency centre for bringing help on the way.

Figure 3:
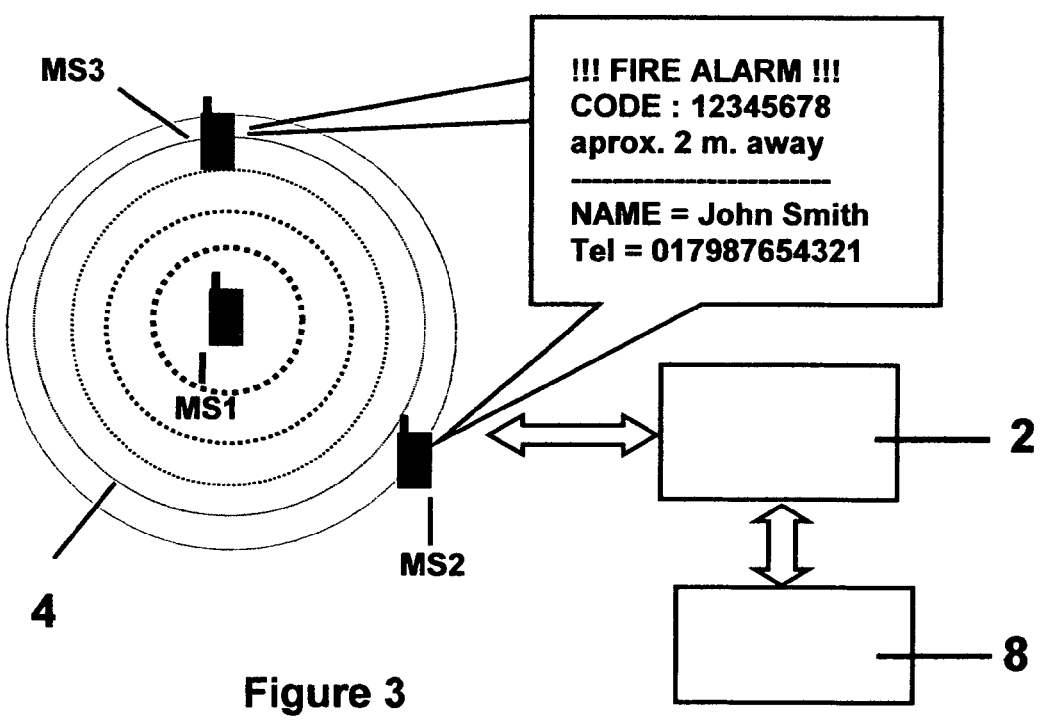
FIG. 3 shows a first mobile station transmitting a predetermined SOSMSG.

FIG. 3 shows a first mobile station MS 1 transmitting a predetermined SOSMSG in plain text "FIRE ALARM" to the neighbouring second and third mobile stations MS 2 and MS 3 together with a sender's address and some information about the FIRE.

Figure 4:
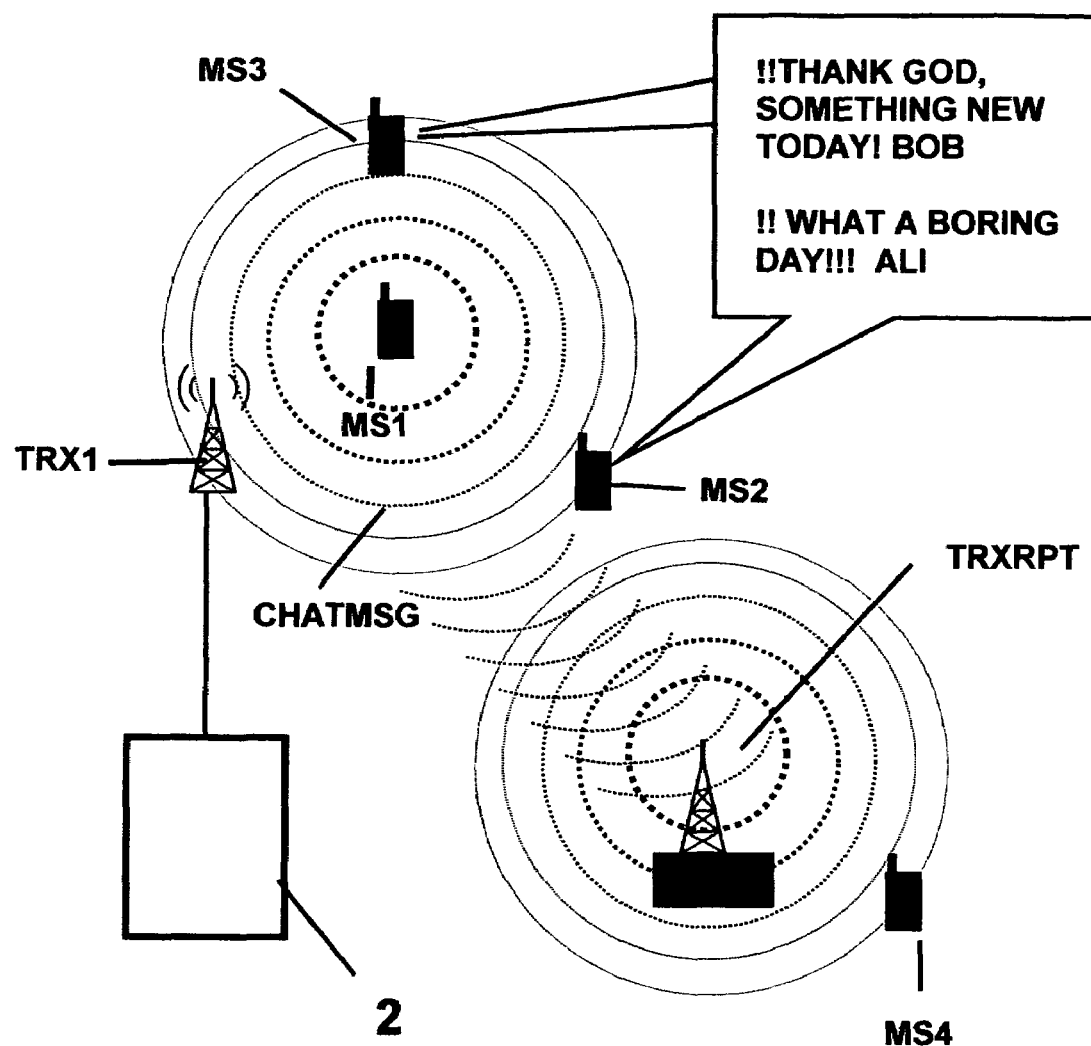
FIG. 4 shows an implementation for the chatline embodiment of the present invention.

FIG. 4 shows an implementation for the chatline embodiment of the present invention, wherein antenna TRX 1 of backbone network 2 broadcasts the chatline frequency to be used by mobile stations MS 1, MS 2, MS 3 and MS 4. CHATMSG transmitted by first mobile station MS 1 and directly received by second and third mobile station MS 2 and MS 3 can be repeated by dedicated repeater antennas TRXRPT in order to be receivable for a fourth mobile station MS 4. Localisation information maybe contained within the emergency signal. However in any case the receiving equipment, i. e. receiving mobile end equipment or the mobile network or the specially dedicated network is able and equipted to make a distance estimate by measuring the signal strength and other properties of the signal.

DETAILED DESCRIPTION OF THE INVENTION

The invention relates to a mobile communication network system, a method of operating same, and a mobile station in such a system according to the preamble of the independent claims. In particular, the invention relates to direct communication and localisation of mobile end equipment and emergency handling.

Under certain circumstances communication by means of known mobile communication network systems is restricted or even impossible, for example within buildings due to signal attenuation, in regions with low or no network covering, and/or due to high communication traffic and limited bandwidths or number of free communication channels. In such cases, particularly in the case of emergency, it is necessary to use a wired telephone network, if available, or to use walkie-talkies.

It is therefore an object of the present invention to provide a mobile communication network system, a method of operating same, and a mobile station in such a system that allows establishing communication for a mobile station even in unfavourable situations. It is further an object to guarantee the possibility of establishing communication in emergency situations and further to allow the localisation of the mobile station the user of which is in the emergency situation. A further object is to make possible communication directly between two or more mobile stations without presenting load for the mobile network communication system, particularly without using network bandwidth reserved for communication between mobile stations and the backbone communication network.

The objects are solved by the system, method and mobile station as defined in the independent claims.

The following abbreviations are used:

| | |
|---|---|
| CHATFREQ | Chat Frequency |
| EMO | Emergency Mode of Operation |
| GSM | Global System for Mobile communications |
| GPS | Global Positioning System |
| MS | Mobile Subscriber (person) or Mobile End User Equipment or Station (equipment) |
| MSTRACK | Mobile subscriber Tracking Equipment |
| MTM | Mobile to Mobile |
| MTMSOS | Mobile to Mobile SOS |
| SMS | Short Message Service |
| SOS | International Emergency Recognition |
| SOSCHAIN | SOS Signalling Take Over/Chaining by another mobile |
| SOSFREQ | SOS Frequency |
| SOSMSG | SOS Message |
| SOSPAT | SOS Pattern |
| SOSTON | SOS Alarm Tone |
| TRXRPT | Repeater Antenna |
| UMTS | Universal Mobile Telecommunication Systems |

By providing at least one direct communication channel by the backbone communication network to be used by said first mobile station for directly communicating with at least one second mobile station, for establishing the communication between the mobile stations a connection of the mobile stations with the network antennas is not necessary. The direct communication can be established even in geographical regions with no network covering, for example in thinly populated regions or within buildings, which is particularly advantageous in a case of emergency like heart attack, robbery, fire or accident. For the direct communication channel a presently unused or free channel within the present mobile communication standards or other frequency bands can be used. Using modern integrated circuit technology broadband radio communication can be implemented in mobile station units with only less or even no significant additional costs. The backbone network can be structured as known in the prior art according to the GMS or UMTS standard, or according to future communication standards.

Said direct communication channel can be predefined in said system, for example by a future mobile communication standard, broadcasted by said backbone communication network, for example similar to existing broadcast services, assigned by said backbone communication network during subscribing procedure of said first mobile station, for example always at turning on the mobile station or when the mobile station moves from one cell or local area to another, and/or assigned by said backbone communication network on request of said first mobile station, for example when the mobile station indicates that it is interested in establishing a communication directly with a neighbouring mobile station.

When a first mobile station requests a connection to a second mobile station via the backbone network as usual in the prior art, according to one embodiment of the present invention the backbone network can inform the first mobile station that the second mobile station is localised nearby, for example within the same cell or local area, and thus available within its range for establishing a direct communication. This decreases the network load within densely populated regions as city centres or the like in which the probability that the second mobile station is nearby is considerable. Expelling the first mobile station to the direct communication channel can be made automatically without given any information to the user of the first mobile station and/or by instructing the first and second mobile stations accordingly.

The invention includes that the mobile stations can not only use the mobile network for communication, but can also use special frequencies to be able to function similarly to walky-talkies. Both the anonymous talk and listen feature of the walky-talkies and an anonymous chatline known from computers can be employed with very little cost on the side of the user. The usage is expected to increase load on the network, but comparatively only very little. The basic idea relating to this is to achieve direct communication between mobile end equipments. The technical details given below represent only an example of the implementation and does not limit the scope of the invention:

(a) Each mobile end equipment is given a special and possibly anonymous code number or name to use within a chatline.

(b) Only those mobile stations being allowed, i.e. registered to the network, to join in chatline, can use this feature.

(c) Mobile network broadcasts the chatline frequency values to be used for Mobile to Mobile communication, within the local area(s). Additionally, or alternatively, a chatline request handling (handshaking) can be protocolled with the network, in such a form that the network allocates and returns the next current chatline frequency value to MS.

(d) Chat line is so protocolled that only one Mobile End Equipment at a time can transmit a message. However, message collisions are expected and dealt with the related MTM data protocol. Methods such as using different, randomly selected virtual channels, user identification attachments, and other protocol identifiers avoid such collision cases.

(e) Message length and message duration can be restricted, to enable others to come into the chatline too.

(f) The chatline is mainly considered as printed message exchange, however voice mailing can also be used the same way. Speech recognition technology can be implemented.

(g) Each message (voice mail or data) is accompanied with the senders identity (anonymous or real), such that in case of disturbing mails, the receiver can issue a complaint via the network operator.

(h) Network receiver elements can be placed to different areas for the network operator to follow-up the chatline messages, to avoid disturbance.

(i) Network receiver elements can allow also remote chatliners to come into the local area for a chat. In such cases however a network call connection or preferably an SMS message exchange to the chatline area is needed.

(j) The actual area of the chatline group is restricted by the reached range of the allowed chatline frequencies and the allowed transmission power on them.

(k) Network operator can define a group of cells or a group of local areas to belong to the same chatline and use the same chatline frequencies and properties.

(l) In case a chatline group on a wider area without network intervention is desired, then repeaters are installed, which detect, amplify and further transmit the chatline frequencies.

(m) In case the number of active chatliners increase above a certain limit, the new chatline requests can receive a new chatline frequency.

(n) Chatline mobiles operate normally at standby, i.e. no active call is necessary. Exception to this may appear in case of a request to join in a remote chatline area.

(o) Not only mobile phones but other equipment such as PC's attached to mobile network can take part in chatline.

(p) Similar to SMS handling by mobile network, a chatline handling can also be processed for remote chatline callers, where an update of chatline data are sent back as SMS messages.

(q) Chatline frequencies are allocated separately from the emergency frequencies.

Direct communication possibility and the transmission and reception of special signals by mobile equipment under guidance and supervision of the mobile communication network system allows also easy handling and fine localisation of MS, in particular under emergency conditions.

An emergency signal can be transmitted by said first mobile station to be received by at least one of said network antennas and/or received by said second mobile station, said emergency signal can be used by a localisation equipment for localizing said first mobile station. If necessary or advantageous, additional network antennas can be provided for transmitting the direct communication channel and/or for receiving emergency signals from the mobile station. An emergency centre within the backbone network can be informed about the incoming emergency signal and ambulance or police can start the search and use their localisation equipment for localizing the first mobile station and hurrying to its users aid or assistance. The emergency call option of the present invention can be provided also without the possibility of direct communication between mobile stations, but only by transmitting an emergency signal to the antennas of the backbone network using a specific emergency signal amplitude, frequency and/or pattern.

Although localisation of the mobile station to tenths of meters is available by different techniques, such as via Mobile End User Equipment own measurements, or via GPS at the mobile station, this is not sufficient enough for most emergency situations. For example in case of an emergency call within a skyscraper, an emergency call of a mobile phone may be localised within a 50 meter radius. But this may mean an emergency call out of one of 20 floors and 80 apartments. Only a localisation of some meters as provided by the present invention can make the difference in terms of help in time.

In case of an emergency situation a Mobile Station or Subscriber (MS), i.e. a Mobile End User Equipment, can send its geographical position to an emergency centre via call set-up and/or via SMS-emergency message with localisation information. The geographical position information can be determined by the MS itself, for example using a GPS module or using signal strength measurements or timing advance measurements. Additionally the Mobile End User Equipment shall go into an Emergency Mode of Operation (EMO) and start operating in one or both of the following modes:

(a) Continuously or with intervals transmit an GSM/UMTS SOS frequency signal (SOSFREQ), which can be easily tracked and localised via external tracking equipment.

(b) Continuously or with intervals start sending an internationally recognised, standardised audible-by-human-ears and/or non-audible-by-human-ears SOS tone (SOSTON).

Following alternatives are possible. One or more of these alternatives can be combined.

(a) Each cell or location area has its own allocated SOS frequency carrier (SOSFREQ), which is informed i.e. broadcasted to MS, via system info or cell-broadcast for example. Whenever MS enters into EMO, it transmits continuously or with short intervals the SOS frequency.

(b) A set of specially selected and allocated frequencies are listed as SOS frequencies. MS can randomly select any one of these frequencies whenever it enters into EMO. MS is expected to inform a centre its selected SOSFREQ via normal or emergency call set-up, or within an SMS message.

(c) In case of an emergency call, an emergency centre returns a SOSFREQ number to MS, such that MS enters into EMO and starts transmitting this particular SOSFREQ continuously or with intervals.

(d) SOSFREQ can be selected by the end equipment or by the emergency centre depending on the type of emergency.

(e) MS SOS Frequencies are received by other Mobile End User Equipment too, such that others in the vicinity of the help-need can react too. A related emergency message can be displayed. If SOSFREQ is categorised, depending on the type of the emergency, display on the other Mobile End Users Equipment can be more detailed.

(f) In case battery power is critically reduced, MS which is entered into EMO, shall activate another mobile equipment in its vicinity, to take over the emergency sending. Emergency chaining Mobile End User Equipment does not however repeat this take-over request signal, to avoid multiple chaining and misleading for the help.

(g) SOSFREQ and its power level is so selected that it transmits only its near vicinity and becomes week at bigger distances.

Interval sending can be selected to allow the Mobile End User Equipment to send the SOS signal a lot longer before the battery runs out. SMS messages are not real time and fast/good enough for all type of emergency situations.

Additional to the SOS continuous or with interval signals, an SOS pattern list is foreseen:

(a) Each cell or location area has its own allocated SOS frequency pattern (SOSPAT), which is informed i.e. broadcasted to MS, via system info, or cell-broadcast for example. Whenever MS enters into EMO, it transmits continuously or with short intervals the SOSPAT.

(b) A set of specially selected and allocated patterns are listed as SOS patterns. MS can randomly select any one of these patterns whenever it enters into EMO. MS is expected to inform a centre of its selected SOSPAT via normal or emergency call set-up, or within an SMS message.

(c) In case of an emergency call, an emergency centre returns a SOSPAT number or string to the MS, such that mobile equipment enters into EMO and starts transmitting this particular SOSPAT continuously or with intervals.

(d) SOSPAT can be selected by the end equipment or by the emergency centre depending on the type of emergency.

(e) MS SOS Patterns are received by other Mobile End User Equipment too, such that others in the vicinity of the help-need can react too. This is defined here as Mobile to Mobile SOS Contact (MTMSOS). A related emergency message shall be displayed.

(f) In case battery power is critically reduced, MS which is entered into EMO, shall activate another Mobile End User Equipment in its vicinity via a different SOS frequency or pattern, to take over the emergency sending. Emergency SOS chaining (SOSCHAIN) Mobile End User Equipment does not however repeat this take-over request signal, to avoid multiple chaining and misleading for the help.

For Emergency Situations, MS can transmit a distress broadcast message that may be received by BTS-TRX if one is nearby and also by other mobile equipment (MTMSOS). Following possibilities are given:

(a) An SOS message transmission (SOSMSG) on a specially allocated GSM/UMTS broadcast channel of the particular cell(s). This message can be received by other Mobile End User Equipment and by the mobile networks too. A related emergency message and identification is transmitted, received, displayed.

(b) An SOS message is transmitted with an SOSFREQ.

One or both of the following functions are proposed:

(a) Present MS support all kinds of tones as for ringing tones. There is need to decide on an internationally introduced an recognised distinct tone as SOS Alarm Tone, such that this tone is separated from any existing ringing tones, and immediately recognised as the owner of the MS being in distress and needing immediate help.

(b) A MS entering into EMO mode can start sending a non-audible SOSTON, such that this SOSTON can be used by external tracking devices to locate the emergency-needing-equipment exactly within meters. Use of animals sensitive to such sound ranges can also be considered. Mobile or backbone network can broadcast SOSTON to be used by the MS within a particular cell or location area.

MS which enters into EMO mode, starts sending SOSTON continuously or with time intervals.

Even in the case that mobile equipment localisation info cannot be passed to an Emergency Centre, and an emergency situation arises, MS enters into EMO and starts transmitting SOSFREQ, SOSPAT and/or SOSTON. These can be received by external equipment designed to localise and interpret such signals to some meters. The external tracking mobile equipment (MSTRACK) has an directional antenna and measures the signal strength at short distances.

Mobile First-Help troop can scan different areas (critical areas) for distress (SOS) signals, patterns, messages and localise them on their own too. This can be taken on a coincidence first-help, in comparison to information first received by the emergency centre.

Additionally, or alternatively, special network receiver elements, such as antennas, and related equipment can be stationed at places where such emergencies may arise. These network elements can be connected to emergency centres, to warn the centre about the existence of such an alarm.

Said emergency signal can be passed on by said second mobile station to said network, for example if the first mobile station is not able to reach an antenna of the backbone network due to its local position and/or low battery power, and/or to a further mobile station for passing on to said network system, for example if also the second mobile station is not able to reach an antenna of the backbone network, thus forming an emergency call chain. Suitable procedures can be implemented in order to avoid confusion, for example by a handshake protocol for the chaining mobile stations guarantying that only one of the chaining mobile stations transmits the emergency call to the emergency centre of the backbone network.

Said emergency signal can be transmitted as a radio signal or as a audio signal, particularly as an ultrasound signal, that is audible for example by special audio equipment or by a tracker dog.

Said emergency signal can comprise information in any suitable form about the geographical position of said first mobile station. The geographical position can be known to the first mobile station due to signal strength measurements within the first mobile station, translation of codes transmitted by the network antennas, using a GPS module or the like.

Different emergency signals can be used differing in amplitude, frequency and/or pattern. For example international recognised emergency frequency channels and/or signal patterns can be used like the emergency frequency used in aviation or the SOS-pattern internationally used.

Each of said different emergency signals can be related to a predefined emergency case, for example for a heart attack another frequency and/or pattern can be used than for an accident. Furthermore, particularly for disease-related emergency calls, specific information about the user of the mobile station can be transmitted within the emergency signal and/or by a parallel message, for example using the SMS service, e.g. anamnesis, present circulation values and the like.

If more than one MS in the same region transmitting SOS signals at the same time several solutions are possible such as e. g.:

(a) Different SOSFREQ from different Mobile End User Equipment (b) Different SOSPAT from different Mobile End User Equipment (c) Weak signal, such that only in the near vicinity detectable (d) Higher frequency signal such that only in the near vicinity detectable One of the possible problems maybe at the reception of SOS signals by other MS, causing a panic in some. Mobile End User Equipment owner is able to turn off this reception of distress signals from other MS.

Another possible problem issue may appear with the SOSCHAIN. The re-transmitter Mobile End User Equipment owner may move rapidly away from the source of the original help-need to another area. The re-transmitter equipment is to keep all the necessary information, such as location, time, date etc., at the start of the distress call. The owner is warned about this extra re-transmitting activation, as well as the distress signal at the vicinity, visually and/or via sound warnings. The receiving/re-transmitting mobile owner can be urged to call the emergency centre, too.

If more than one mobile tries to take over the re-transmissions at the same time, this may make the localisation even more difficult. Therefore, a handshaking protocol can be implemented between the emergency-needing weak-power mobile and the chaining mobile, such that not more than an allowed number of mobiles takes over the re-transmission.

The present invention is not limited to the actual frequency bands and ranges for both high frequency transmission and sound transmissions, because these frequency bands are under the control and licensing arrangement of each country individually. Ideally, however, it is proposed that global SOSFREQ, SOSPAT, SOSTON agreements should ease the usage of this important patent application, universally.

Mobile End User Equipment owners may bring their equipment into EMO out of curiosity, test or as hoax call for playout. This shall be taken as serious as pulling out the red cord within a running train, and seriously be punished. But for technical innovation and implementation here is also extended/proposed here to discourage the end user to activate EMO unnecessarily.

Following implementations maybe proposed:

(a) MS entering EMO stay in this mode until all its battery power is exhausted, i.e. turn off on the device does not function any more.

(b) Calls to others within EMO is allowed, but call duration is restricted, to allow continuation on the SOS signalling.

(b) Exit from EMO is possible only via network operator at the emergency centre.

The invention claimed is:

1. A mobile communication network system (1) comprising a plurality of mobile stations and a backbone communication network (2) with network antennas (TRX 1) for establishing communication (3) between a first mobile station (MS 1) of said plurality of mobile stations and said backbone communication network (2), characterized in that at least one direct communication channel is provided by said backbone communication network (2), said direct communication channel can be used by said first mobile station (MS 1) for broadcasting data messages, within near vicinity and to other mobile devices, which comprise means for estimating distance and direction to the said first mobile station, in particular for evaluating signal strength and other properties of the emergency signal where different emergency signals are provided differing in amplitude, frequency and pattern and where these emergency signals can be received by other mobile stations (MS2) or by network antennas (TRX1) or by special localization equipments (MSTRACK 5,6,7) in such a way that the signal can be used for localizing the said first mobile station (MS1).

2. The system of claim 1, characterized in that said direct communication channel is
   predefined in said system (1),
   broadcasted by said backbone communication network (2),
   assigned by said backbone communication network (2) during subscribing procedure of said first mobile station (MS 1), and/or
   assigned by said backbone communication network (2) on request of said first mobile station (MS 1).

3. The system of claim 1, characterized in that in case the battery power of MS1 is critically reduced, MS1 which is entered into EMO (Emergency Mode of Operation), shall activate another mobile equipment MS2 in its vicinity, to take over the emergency sending, where this MS2 will not however repeat this take-over request signal, to avoid multiple chaining and misleading for the help.

4. The system of claim 1, characterized in that said emergency signal is transmitted as a radio signal or as an audio signal, particularly as an ultrasound signal.

5. The system of one of claims 1, characterized in that said emergency signal comprises information about the geographical position of said first mobile station (MS 1).

6. The system of claim 1, characterized in that each of said different emergency signals is related to a predefined emergency case.

7. A method of operating a mobile communication network system (1) comprising a plurality of mobile stations and a backbone communication network (2) with network antennas (TRX 1) for establishing communication between a first mobile station (MS 1) of said plurality of mobile stations and said backbone communication network (2), characterized by providing at least one direct communication channel for enabling said first mobile station (MS 1) to broadcast data messages, within near vicinity and to other mobile devices, which comprise means for estimating distance and direction to the said first mobile station, in particular for evaluating signal strength and other properties of the emergency signal where different emergency signals are provided differing in amplitude, frequency and pattern and where these emergency signals can be received by other mobile stations (MS2) or by network antennas (TRX1) or by special localization equipments (MSTRACK 5,6,7) in such a way that the signal can be used for localizing the said first mobile station (MS1).

8. A mobile station in a mobile communication network system (1) comprising a plurality of mobile stations and a backbone communication network (2) with network antennas (TRX 1) for establishing communication between a first mobile station (MS 1) of said plurality of mobile stations and said backbone communication network (2), characterized in that said first mobile station (MS 2) broadcasts data messages, within near vicinity and to other mobile devices, which comprise means for estimating distance and direction to the said first mobile station, in particular for evaluating signal strength and other properties of the emergency signal where different emergency signals are provided differing in amplitude, frequency and pattern and where these emergency signals can be received by other mobile stations (MS2) or by network antennas (TRX1) or by special localization equipments (MSTRACK 5,6,7) in such a way that the signal can be used for localizing the said first mobile station (MS1).

* * * * *